(12) United States Patent
Ness et al.

(10) Patent No.: US 10,233,329 B2
(45) Date of Patent: Mar. 19, 2019

(54) POLYMER-ENCAPSULATED PIGMENT PARTICLE

(71) Applicant: SWIMC LLC, Cleveland, OH (US)

(72) Inventors: Jason Ness, Woodbury, MN (US); Haibo Li, High Point, NC (US)

(73) Assignee: SWIMC LLC, Minneapolis, MN (US)

(*) Notice: Subject to any disclaimer, the term of this patent is extended or adjusted under 35 U.S.C. 154(b) by 0 days.

(21) Appl. No.: 14/997,891

(22) Filed: Jan. 18, 2016

(65) Prior Publication Data

US 2016/0130450 A1    May 12, 2016

Related U.S. Application Data

(63) Continuation of application No. PCT/US2014/047188, filed on Jul. 18, 2014.

(60) Provisional application No. 62/025,277, filed on Jul. 16, 2014, provisional application No. 61/856,560, filed on Jul. 19, 2013.

(51) Int. Cl.

| C09D 7/65 | (2018.01) |
| C09D 133/10 | (2006.01) |
| C09C 1/36 | (2006.01) |
| C09D 17/00 | (2006.01) |
| C09D 5/02 | (2006.01) |
| C09D 133/14 | (2006.01) |
| C09C 3/10 | (2006.01) |

(52) U.S. Cl.
CPC .............. *C09C 1/3676* (2013.01); *C09D 5/02* (2013.01); *C09D 7/65* (2018.01); *C09D 17/008* (2013.01); *C09D 133/14* (2013.01); *C09C 3/10* (2013.01)

(58) Field of Classification Search
CPC .......................... C09D 7/1225; C09C 1/3676
See application file for complete search history.

(56) References Cited

U.S. PATENT DOCUMENTS

| 4,421,660 | A | 12/1983 | Hajna |
| 4,665,107 | A | 5/1987 | Micale |
| 5,171,772 | A | 12/1992 | Hoy et al. |
| 5,531,816 | A | 7/1996 | Wickramanayake |
| 5,543,219 | A | 8/1996 | Elwakil |
| 7,071,261 | B2 | 7/2006 | Devonport et al. |
| 7,160,953 | B2 | 1/2007 | Bowers |
| 7,579,081 | B2 | 8/2009 | Brown |
| 7,795,330 | B2 | 9/2010 | Birmingham et al. |
| 7,960,026 | B2 | 6/2011 | Koller |
| 8,283,404 | B2 | 10/2012 | Allen et al. |
| 8,304,485 | B2 | 11/2012 | Allen et al. |
| 9,284,467 | B2 | 3/2016 | Booth |
| 9,598,594 | B2 | 3/2017 | Booth |
| 2003/0232914 | A1 | 12/2003 | Devonport et al. |
| 2004/0197359 | A1 | 10/2004 | Yamada et al. |
| 2006/0260505 | A1 | 11/2006 | Ham et al. |
| 2007/0141247 | A1 | 6/2007 | Hall et al. |
| 2007/0196291 | A1* | 8/2007 | Sakuta .................. A61K 8/896 424/59 |
| 2008/0002004 | A1 | 1/2008 | O'Donnell et al. |
| 2008/0026221 | A1 | 1/2008 | Vincent et al. |
| 2009/0253853 | A1 | 10/2009 | Lin et al. |
| 2010/0056668 | A1 | 3/2010 | Brown |
| 2010/0298484 | A1 | 11/2010 | Allen et al. |
| 2011/0251304 | A1 | 10/2011 | Brown |
| 2012/0244346 | A1 | 9/2012 | Moorlang et al. |
| 2013/0085222 | A1 | 4/2013 | Fasono et al. |
| 2013/0087736 | A1 | 4/2013 | Baker et al. |
| 2014/0011943 | A1 | 1/2014 | Bardman et al. |
| 2014/0121305 | A1 | 5/2014 | Brown et al. |
| 2014/0335348 | A1 | 11/2014 | Kitamura |
| 2015/0080521 | A1 | 3/2015 | Korenkiewicz |
| 2015/0272838 | A1* | 10/2015 | Lee ................... A61K 49/0423 424/401 |
| 2016/0130450 | A1 | 5/2016 | Ness |

FOREIGN PATENT DOCUMENTS

| EP | 2161304 A1 | 3/2010 |
| EP | 2343344 A1 | 7/2011 |
| WO | WO-2010074865 A1 | 7/2010 |
| WO | 2012116025 A1 | 8/2012 |
| WO | WO 2014084657 A1 * | 6/2014 ......... A61K 49/0423 |
| WO | WO-2015010016 A1 | 1/2015 |

OTHER PUBLICATIONS

International Search Report and Written Opinion for International application No. PCT/US2014047188, dated Nov. 7, 2014. (11 pages).
Extended European Search Report for Application No. 14826975.6, dated Jan. 24, 2017, 10 pages.
Extended European Search Report for Application No. EP15867968, dated May 11, 2018, 9 pages.
International Search Report and Written Opinion for Application No. PCT/US2015/064000, dated Mar. 16, 2016, 10 pages.
International Preliminary Report on Patentability for Application No. PCT/US2015/064000, dated Jun. 22, 2017, 9 pages.
International Preliminary Report on Patentabilityfor Application No. PCT/US2014/047188, dated Jan. 28, 2016, 10 pages.

* cited by examiner

*Primary Examiner* — Wenwen Cai
(74) *Attorney, Agent, or Firm* — Patterson Thuente Pedersen, P.A.

(57) ABSTRACT

A polymer-encapsulated pigment dispersion is prepared from a mixture of (a) a carrier; (b) pigment particles; and (c) a polymeric dispersing agent having a polymer backbone, and a zwitterionic polymer side chain comprising anionic and cationic groups. The dispersing agent may provide efficient pigment wetting and dispersion using relatively low and thus economical pigment amounts, with good opacity and good hiding characteristics, especially in titanium dioxide-containing coating compositions.

19 Claims, No Drawings

POLYMER-ENCAPSULATED PIGMENT PARTICLE

CROSS-REFERENCE TO RELATED APPLICATION(S)

This application is a continuation of International Application Number PCT/US2014/047188, filed 18 Jul. 2014, which claims priority to U.S. Provisional Application No. 62/025,277, filed 16 Jul. 2014 and U.S. Provisional Application No. 61/856,460 filed 19 Jul. 2013, each of which is incorporated by reference herein in its entirety.

FIELD

This invention relates to pigment wetting and dispersing agents, pigment grind dispersions, pigment-encapsulating dispersions, and to pigmented paints and other coating compositions.

BACKGROUND

Titanium dioxide is a widely-used but increasingly expensive pigment in paints and other coating compositions. In many paint formulations titanium dioxide represents the single most expensive raw material. A number of techniques and ingredients have been suggested for reducing the amount of titanium dioxide in coating composition formulations while still providing acceptable light scattering or opacity. One such ingredient is EVOQUE™ Pre-Composite Polymer supplied by Dow Chemical Company. EVOQUE products are presently available in four grades (EVOQUE 1140, EVOQUE 1180, EXP-4340 and EXP-4463) that are said to have differing degrees of reactivity towards titanium dioxide. According to its supplier, EVOQUE pre-composite polymer "combines with $TiO_2$ to form a polymer-pigment composite which improves both the wet and dry hiding efficiency of the pigment." Paints or other coating compositions made from such a composite may attain a given degree of pigment hiding at a somewhat reduced titanium dioxide pigment level, or may attain a somewhat increased degree of pigment hiding at a given titanium dioxide pigment level. However, the potential savings in titanium dioxide raw material costs and the potential benefits in pigment hiding efficiency are offset by the EVOQUE product cost.

A variety of other polymers have been proposed for use with pigments, for example as pigment dispersing agents. Synthesis of some of these polymers requires expensive starting monomers or complex synthetic schemes. In other instances the polymers have high viscosities, limited pigment dispersing capabilities or other drawbacks.

From the foregoing, it will be appreciated that what remains needed in the art are improved pigment-containing coating compositions having even lower raw material cost, even greater pigment hiding efficiency, or both lower cost and greater efficiency. Such compositions and components and methods for their manufacture are disclosed and claimed herein.

SUMMARY OF THE INVENTION

The present description provides, in one aspect, a pigment grind dispersion comprising a mixture of a carrier, pigment particles, a polymeric dispersing agent having polymer backbone, and a zwitterionic polymer side chain comprising anionic and cationic groups.

The description provides, in a further aspect, a pigment-encapsulating polymer dispersion including a mixture of a carrier, pigment particles, the particles being at least partially encapsulated by at least one polymer layer, and a polymeric dispersing agent having a polymer backbone, and a zwitterionic polymer side chain comprising anionic and cationic groups.

The description provides, in yet another aspect, a method for making a pigment grind dispersion. The method includes steps of mixing a carrier, pigment particles, and a polymeric dispersing agent having a polymer backbone, and a zwitterionic polymer side chain comprising anionic and cationic groups.

The present description provides, in a further aspect, a method for making a pigment-encapsulating polymer dispersion. The method includes steps of forming a dispersion of a carrier, pigment particles, and a polymeric dispersing agent having a polymer backbone, and a zwitterionic polymer side chain comprising anionic and cationic groups. In an embodiment, this is followed by including in or adding to the dispersion one or more ethylenically unsaturated monomers and a free-radical initiator, and polymerizing the ethylenically unsaturated monomers to at least partially encapsulate the pigment particles with at least one polymer layer.

The present invention provides, in a further aspect, a coating composition that includes a dispersion of a carrier, pigment particles, the pigment particles being at least partially encapsulated by at least one polymer layer, and a polymeric dispersing agent having a polymer backbone, and a zwitterionic polymer side chain comprising anionic and cationic groups. In addition, the composition also includes one or both of a film-forming binder containing a polymer other than the encapsulating polymer, or one or more standard paint formulation additives.

The disclosed dispersions, methods and coating compositions may comprise, consist essentially of, or consist of the recited ingredients. In exemplary preferred embodiments, the carrier comprises water, the pigment particles comprise titanium dioxide particles, the polymer backbone comprises a vinyl chain-growth polymer, the anionic group comprises a sulfonate group, the cationic group comprises a quaternary ammonium group, and the at least partially encapsulated pigment particles are self-coalescing at room temperature without requiring the presence of a film forming binder containing a polymer other than the chain-growth polymer. The disclosed polymeric dispersing agents may provide efficient pigment wetting and dispersion using relatively low and thus economical raw material amounts (for example, pigment, polymeric dispersing agent and chain growth polymer amounts). Preferred embodiments of the disclosed dispersions, methods and coating compositions desirably provide good pigment particle wetting, and improved pigment dispersion in the final dried film, especially in titanium dioxide-containing latex paints, where improved dispersion leads to improved pigment hiding efficiency.

DETAILED DESCRIPTION

Unless the context indicates otherwise the following terms shall have the following meaning and shall be applicable to the singular and plural:

The terms "a," "an," "the," "at least one," and "one or more" are used interchangeably. Thus, for example, a coating composition that contains "a" carrier or "an" optional surfactant means that the coating composition may include "one or more" carriers and "one or more" optional surfactants.

The term "anionic group" when used in respect to a monomer or a polymer side chain means an organic group having a net negative charge, and preferably a pH-independent net negative charge, when dissolved or dispersed in an aqueous carrier.

The term "binder" when used in respect to a liquid coating composition means a film-forming natural or synthetic polymer suitable for use in such a composition (if need be, accompanied by a suitable coalescent).

The term "bulk polymer" means a polymer formed from a homogeneous reaction mixture made by dissolving a suitable initiator in one or more reactive monomers and not requiring the presence of a solvent to carry out polymerization.

The term "carrier" when used in respect to a pigment grind dispersion or coating composition means a volatile dispersant or other vehicle for the remaining components of the dispersion or composition.

The term "cationic group" when used in respect to a monomer or a polymer side chain means an organic group having a net positive charge, and preferably a pH-independent net positive charge, when dissolved or dispersed in an aqueous carrier.

The term "emulsion polymer" means a polymer formed from a heterogeneous reaction mixture initially in the form of an emulsion containing water, one or more monomers and an emulsifying agent (e.g., a surfactant). The term "pigment-encapsulating polymer dispersion, as used herein, refers to pigment particles at least partially encapsulated by a polymeric layer. The term is used interchangeably with "polymer-encapsulated pigment dispersion."

The term "film-forming" when used in reference to a water-insoluble polymer means that an aqueous dispersion of the polymer (if need be, accompanied by a suitable coalescent) can be formed, coated in a thin wet layer (e.g., of about 25 μm thickness, and if need be at a temperature above room temperature) on a suitable substrate or support, and dried or otherwise hardened, to form a substantially continuous coating over the substrate or support.

The term "contrast ratio" means a value determined by casting an approximately 51 μm (2 mil) dry thickness coating film over the white and black portions of a Leneta Co. Form 3B opacity drawdown chart (from BYK-Gardner USA), measuring L* as defined in the ASTM International Standards on Color and Appearance Measurement: 8th Edition, and dividing the L* value measured over the black portion by the L* value measured over the white portion.

The term "functional" when used with respect to an organic group in a monomer or polymer means a group enabling such monomer or polymer to participate in a chemical reaction, or to assist in suspending or dispersing pigment in a carrier.

The terms "group" and "moiety" are used to differentiate between chemical species that allow for substitution or that may be substituted and those that do not allow or may not be so substituted. Thus, when the term "group" is used to describe a chemical substituent, the described substituent includes the unsubstituted group and that group with O, N, Si, or S atoms, for example, in the chain (e.g., as in an alkoxy group) as well as that group with carbonyl or other conventional substituents. When the term "moiety" is used to describe a chemical compound or substituent, only an unsubstituted chemical material or substituent is intended to be included. For example, the phrase "alkyl group" is intended to include not only pure open chain saturated hydrocarbon alkyl substituents, such as methyl, ethyl, propyl, t- butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. The term "alkyl group" encompasses the term "alkyl moiety", and the disclosure of any particular group is also intended to be an explicit disclosure of the corresponding moiety of that particular group.

The term "intervening" when used with respect to the number of atoms between two organic functional groups refers to the number of atoms in the shortest path between such groups, not counting atoms of such groups.

The term "latex" when used in respect to a polymer means an emulsion of polymer particles in water in which the polymer is not itself capable of being dispersed in water; rather, a latex polymer requires a secondary emulsifying agent (e.g., a surfactant) to form the emulsion. The term is synomous and used interchangeably with the term "aqueous polymer dispersion."

The term "low VOC" when used with respect to paints and other coating compositions means that the coating composition contains less than about 1 wt. percent volatile organic compounds, preferably less than about 0.5 wt. % volatile organic compounds, more preferably less than about 0.05 wt. % volatile organic compounds and most preferably less than about 0.005 wt. % volatile organic compounds based upon the total coating composition weight.

The term "monomer" means a material that can be reacted, as need be in the presence of a suitable initiator or comonomer, to form a polymer containing three or more repeating units derived from the monomer or comonomer.

The term "multistage" when used with respect to a latex means the latex polymer was made using discrete charges of two or more monomers or was made using a continuously-varied charge of two or more monomers. Usually, a multistage latex will not exhibit a single Tg inflection point as measured using DSC. For example, a DSC curve for a multistage latex made using discrete charges of two or more monomers may exhibit two or more Tg inflection points. Also, a DSC curve for a multistage latex made using a continuously-varied charge of two or more monomers may exhibit no Tg inflection points. By way of further explanation, a DSC curve for a single stage latex made using a single monomer charge or a non-varying charge of two or more monomers may exhibit only a single Tg inflection point. Occasionally when only one Tg inflection point is observed it may be difficult to determine whether the latex represents a multistage latex. In such cases a lower Tg inflection point may sometimes be detected on closer inspection, or the synthetic scheme used to make the latex may be examined to determine whether or not a multistage latex would be expected to be produced.

The term "pigment" when used in respect to a coating composition or pigment grind dispersion means a particulate material which imparts one or more of color (including white or black), or other visual or performance effects to the composition or dispersion. The term pigment includes, without limitation, extender pigments, opacifying pigments, tinting pigments, etc. As used herein, the term "extender pigment" or "filler" refers to an inert, usually colorless and semi-transparent pigment used in a coating composition to fortify and lower the total cost. An "opacifying pigment" refers to one or more pigments added to a paint composition to make it opaque. As used herein, "opaque" means that a dry film of the coating composition has a contrast ratio greater than 95% at a 51 μm (2 mil) dry film thickness. In general, an extender pigment is assumed to have a refractive index of less than about 1.8, whereas an opacifying pigment is assumed to have a refractive index of greater than about 1.8.

The terms "pigment volume concentration" or "PVC" when used in respect to a coating composition mean the total percentage of dried coating volume occupied by all pigment species in the coating. PVC may be calculated as the fraction: PVC=pigment volume/(pigment volume+non-pigment volume).

The term "polymer" includes both homopolymers and copolymers (viz., polymers of two or more different monomers) having two or more repeating units and a weight average molecular weight (Mw) of at least 500 as measured using gel permeation chromatography and a polystyrene standard.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

When used with respect to a component which may be found in a coating composition or pigment grind dispersion, the term "substantially free of" means containing less than about 1 weight percent of the component based on the coating composition or pigment grind dispersion weight.

The term "vinyl" when used with respect to a monomer means a site of ethylenic unsaturation (preferably, terminal ethylenic unsaturation) having the formula —CH=CH$_2$—.

The term "waterborne" when used in respect to a coating composition or pigment grind dispersion means that the major carrier is water.

The term "solvent-borne" when used with respect to a pigment grind dispersion or coating composition means that the major carrier is a non-aqueous solvent or a mixture of non-aqueous solvents.

The term "water-dispersible" when used in respect to a polymer means that without requiring the use of a separate surfactant, the polymer is itself capable of being dispersed into water, or water can be added to the polymer to form an aqueous dispersion. Such water-dispersible polymers may include nonionic or ionic functionality on the polymer to assist in rendering the polymer water-dispersible. For such polymers, external acids or bases are typically required for ionic stabilization, but not in all cases. For example, a water-soluble composition (i.e. a highly hydrophilic polymer composition or system) would not require such stabilization. However, these external acids are not secondary emulsifying agents (e.g., surfactants) such as are used to form a latex polymer emulsion.

The term "zwitterionic" when used in respect to a monomer or a polymer side chain means the monomer or the polymer side chain has at least one anionic group and at least one cationic group.

The recitation of a numerical range using endpoints includes all numbers subsumed within that range (e.g., 1 to 5 includes 1, 1.5, 2, 2.75, 3, 3.80, 4, 5, etc.).

A variety of pigment particles may be employed in the disclosed dispersions, methods and coating compositions. The particles provide light scattering sites within a dried film of the disclosed coating compositions, and impart hiding or opacity to the dried film. The light scattering ability of the pigment is described in terms of its refractive index. Accordingly, in an aspect, pigment particles described herein have a broad range of refractive indices, from about 1.2 to about 2.7. Without limiting to theory, extender pigments will generally have refractive index of less than about 1.8, while opacifying pigments will have refractive index of greater than about 1.8.

Exemplary pigment particles include opacifying pigment particles such as treated or untreated inorganic pigments and mixtures thereof, for example metallic oxides including titanium dioxide, iron oxides of various colors (including black); other oxides including zinc oxide, antimony oxide, zirconium oxide, chromium oxide, and lead oxide; sulfates, sulfides and mixtures thereof including barium sulfate, zinc sulfide and lithopone; and metallic flakes such as aluminum flakes, pearlescent flakes, and the like. Representative pigments may have a variety of forms, for example rutile, anatase and Brookite forms in the case of titanium dioxide pigments. The pigment particles may have a variety of shapes and sizes but desirably will scatter photons having wavelengths in the spectral region from about 300 nm to about 1000 nm, such as the infrared region from about 700 to about 1000 nm, the visible spectral region from about 380 nm to about 700 nm, or portions or combinations thereof. Suitable pigment particle shapes include spherical shapes, such as a regular sphere, an oblate sphere, a prolate sphere, and an irregular sphere; cubic shapes such as a regular cube and a rhombus; plate-like shapes including a flat plate, a concave plate, and a convex plate; and irregular shapes. Particles having spherical shapes desirably have average diameters of about 5 nm to about 5,000 nm, e.g., about 10 nm to about 1,000 nm, about 100nm to about 500 nm, about 200 nm to about 300 nm, or about 220 to about 280 nm. Particles having non-spherical shapes desirably have a maximum diameter of up to about 1 micrometer, e.g., up to about 500 nm or up to about 300 nm. The pigment particles may include one or more coatings or surface treatments, for example, inorganic or organic coatings or surface treatments such as silica, alumina, zirconia, hydrous titania, tin oxide, zinc oxide, cerium oxide, phosphate, nitrate, polyols, amines, amine salts, silicones, siloxanes and combinations thereof (for example, a silica coating and an alumina coating). The pigment particles may be uncoated and untreated, but may be sufficiently well encapsulated as disclosed herein so that the encapsulated pigment particles can be employed in exterior coatings while requiring reduced levels of UV absorbers, antioxidants or other weathering-resistant additives compared to coatings made from pigment particles that have not been so encapsulated. Suitable pigments are commercially available from a variety of suppliers including BASF, the LANXESS Inorganic Pigment Business Unit of Bayer Corp., Cabot Corp, Ciba Specialty Chemicals, Clariant, Ferro Corporation, Shepherd Color Company, Sun Chemical and Tomatec America, Inc. Titanium dioxide pigment particles are preferred and include those made by the chloride process, those made by the sulfide process, and those made in slurry or dry forms. Exemplary titanium dioxide pigments include KRONOS™ 1071, 2020,2044, 2090, 2101, 2102, 2131, 2160, 2210, 2310, 4102, 4310 and 4311 from Kronos, Inc., TIONA™ 595 and 596i from Millennium Specialty Chemicals Inc. TIPURE™ TS-6200, R-706, R-741, R-746, R-900, R-902+, R-931 and R-960 from E. I. duPont de Nemours and Company, TRONOX™ CR-813, CR-813S, CR-826, CR-826S, CR-828, CR-834 and CR-880 from Tronox Corporation, and products from other suppliers including Bluestar New Chemical Materials Co., Ltd., Hebei Chuanghui Chemicals Co., Ltd., Henan Billions Chemicals Co., Ltd., Ishihara Sangyo Kaisha, Ltd., Nanjing Hengsiman Chemical Co., Ltd., Pangang Titanium Industry Co., Ltd., Qingdao Gracecorp Co., Ltd., Sakai Chemical Industry Co., Ltd., Shanghai Yuejiang Titanium Chemical Manufacturer Co., Ltd., Shijiazhuang Kelichuangxin Chemicals Co., Ltd. and Xuzhou Zhonglian Chemical Technology Co., Ltd. and mixtures thereof The disclosed pigment grind dispersions may also contain a variety of extender pigments or filler materials including talcs, china clay, barytes, carbonates, silicates and mixtures thereof. Exemplary such materials include magnesium silicates, calcium carbonate, aluminosilicates, silica and various clays.

If desired the disclosed pigment grind dispersions may include other pigments, including dyes, treated or untreated organic pigments, glasses and mixtures thereof. Exemplary such materials include various carbon blacks, azo pigments, benzimidazolinones, carbazoles such as carbazole violet, indanthrones, isoindolinones, isoindolons, perylenes, phthalocyanines, quinacridones, thioindigo reds, organic pigments including plastic pigments such as solid bead pigments (e.g., polystyrene or polyvinyl chloride beads), and microsphere pigments containing one or more voids and vesiculated polymer particles (e.g., those discussed in U.S. Pat. Nos. 4,427,835, 4,920,160, 4,594,363, 4,469,825, 4,468,498, 4,880,842, 4,985,064, 5,5157,084, 5,041,464, 5,036,109, 5,409,776, and 5,510,422). Other exemplary such materials include EXPANCEL™ 551DE20 acrylonitrile/vinyl chloride expanded particles (from Expancel Inc.), SIL-CEL™ 43 glass micro cellular fillers (from Silbrico Corporation), FILLITE™ 100 ceramic spherical particles (from Trelleborg Fillite Inc.), SPHERICEL™ hollow glass spheres (from Potter Industries Inc.), 3M ceramic microspheres including grades G-200, G-400, G-600, G-800, W-210, W-410, and W-610(from 3M), 3M hollow microspheres including 3M Performance Additives iM3OK (also from 3M), INHANCE™ UH 1900 polyethylene particles (from Fluoro-Seal Inc.), and BIPHOR aluminum phosphate (from Bunge Fertilizantes S.A., Brazil).

The pigments are used in an amount sufficient to provide a suitably tinted, and if need be, suitably opaque cured coating composition at the desired coating thickness level, e.g., at pigment volume concentrations (PVC) of about 0.25 to about 95 volume percent. The pigment particles may improve the opacity or hiding of a coating composition formulated over a wide variety of desired PVC values. Preferably, the PVC of the disclosed coating compositions is from about 5 to about 85%, and more preferably from about 10 to about 60%.

The disclosed pigment grind dispersions may be made by blending together the disclosed pigment particles, polymeric dispersing agent, a carrier and an optional surfactant. Without intending to be bound by theory, the grind process may involve deagglomeration of pigment particles (induced for example by shear or other forces in the stirred pigment grind dispersion), and the polymeric dispersing agent may help wet out the newly-exposed pigment surface area, electrostatically (or otherwise) stabilize the deagglomerated particles, and prevent or discourage them from reagglomerating. The polymeric dispersing agent accordingly may promote more efficient pigment particle use and increase the extent to which such particles scatter light and opacify the disclosed coating compositions. The polymeric dispersing agent may for example be a bulk polymer, solution polymer or a water-dispersible polymer, or an aqueous polymer dispersion, and may for example be made by polymerizing a mixture of ethylenically unsaturated zwitterionic monomer(s), and ethylenically unsaturated monomer(s) in a suitable carrier and in the presence of an initiator. The polymeric dispersing agent may for example represent at least about 0.1, at least about 0.2, at least about 0.3, or at least about 0.5 wt. %, and up to about 25, up to about 10, up to about 5, or up to about 2 wt. % of the opacifying pigment particle weight.

A variety of ethylenically unsaturated zwitterionic monomers may be used to form the disclosed polymeric dispersing agent. The ethylenically unsaturated zwitterionic monomers may include one or more (and preferably one) ethylenically unsaturated group, preferably a terminal vinyl group. The ethylenically unsaturated zwitterionic monomers also include one or more (and preferably one) anionic group and one or more (and preferably one) cationic group. The anionic and cationic groups provide zwitterionic polymer side chains each comprising an anionic group and a cationic group in the polymeric dispersing agent, and may help the polymeric dispersing agent assist in wetting and stabilization as discussed above. Exemplary anionic groups form anions in the presence of water. Non-limiting examples of anionic groups include neutralized acid or anhydride groups, sulfate groups (e.g., $-OSO_3^-$)' sulfonate groups (e.g., $-SO_2O^-$), phosphate groups (e.g., $-PO_4^{2-}$), phosphinate groups (e.g., $-POO^-$), phosphonate groups (e.g., $-PO_3^-$) or carboxylate groups (e.g., $-COO-$). Exemplary cationic groups form cations in the presence of water. Non-limiting examples of cationic groups include quaternary ammonium groups (e.g., $-NH_3^+$, $-NH_2R_1^+$ or $-NHR_1R_2^+$ where $R_1$ and $R_2$ are organic groups), quaternary phosphonium groups (e.g., $-PR_1R_2R_3^+$ where $R_1$, $R_2$ and $R_3$ are organic groups) or tertiary sulfate groups (e.g., $SR_1R_2^+$ where $R_1$ and $R_2$ are organic groups). The addition of water to a monomer containing amine groups normally would not convert the amine groups to quaternary ammonium cations and accordingly monomers merely containing anionic groups and such amine groups would not be regarded as zwitterionic monomers. Exemplary ethylenically unsaturated zwitterionic monomers include sulfobetaine (meth)acrylates, phosphobetaine (meth)acrylates and carboxybetaine (meth)acrylates including sulfobetaine methacrylate (CAS No. 3637-26-1; also known as 3-dimethyl(methacryloyloxyethyl)ammonium propane sulfonate, as N-(3-sulfopropyl)-N-(methacryloxyethyl)-N,N-dimethylammonium betaine) or as [2-(methacryloyloxy)ethyl]dimethyl-(3-sulfopropyl)ammonium hydroxide),2-methacryloyloxyethyl phosphorylcholine (CAS No. 67881-98-5), and monomers having betaine groups like those described in U.S. Patent Application Publication No. US 2011/0137001 A1 (Prat et al.) including the commercially-available monomers RALU® MER SPE, RALU® MER SPP, RALU® MER SPDA and RALU® MER SPV from Raschig. Mixtures of ethylenically unsaturated zwitterionic monomers may also be employed. The ethylenically unsaturated zwitterionic monomer may for example represent at least about 0.5 wt.%, and up to about 99.5 wt. %, of the disclosed polymeric dispersing agent.

In an embodiment, the disclosed polymeric dispersing agent may be formed from a variety of monomers, including hydrophobic or hydrophilic monomers. A variety of ethylenically unsaturated hydrophobic monomers may be used to form the disclosed polymeric dispersing agent. The ethylenically unsaturated hydrophobic monomers may include one or more (and preferably include one) ethylenically unsaturated groups, preferably a terminal vinyl group. The ethylenically unsaturated hydrophobic monomers also include one or more (and preferably include one) hydrophobic group, and preferably do not include hydrophilic groups. The hydrophobic groups provide hydrophobic polymer side chains in the polymeric dispersing agent. Exemplary hydrophobic groups include alkyl groups having 3 or more carbon atoms, aryl groups, fatty acid residues, fluorocarbon groups and silicone groups. Exemplary ethylenically unsaturated hydrophobic monomers include n-propyl methacrylate, isopropyl methacrylate, n-butyl methacrylate, isobutyl methacrylate, t-butyl methacrylate, 2-ethyl hexyl methacrylate, isodecyl methacrylate, styrene, substituted styrenes (e.g., vinyltoluene, alpha-methyl styrene, para-methylstyrene, para-t-butylstyrene, and divinylbenzene), allyl compounds (e.g., diallyl phthalate and 2,4,6-triallyloxy-1,3,5-triazine), lauryl methacrylate, stearyl methacrylate, behenyl methacrylate, trimethylcyclohexyl methacrylate, cyclohexyl methacrylate, t-butyl cyclohexyl methacrylate, isobornyl methacrylate, t-butyl cyclohexyl methacrylate, phenyl methacrylate, benzyl methacrylate, the acrylate counterparts thereof and mixtures thereof. The ethylenically unsaturated hydrophobic monomer may for example represent at least about 0.5 wt. %, and up to about 99.5 wt. %, of the disclosed polymeric dispersing agent.

A variety of ethylenically unsaturated hydrophilic monomers may be used to form the disclosed polymeric dispersing agent. The ethylenically unsaturated hydrophilic monomers may include one or more (and preferably one) ethylenically unsaturated group, preferably a terminal vinyl group. The ethylenically unsaturated hydrophilic monomers also include one or more (and preferably one) hydrophilic group, for example an acidic group, amino group or ethylene oxide group. The hydrophilic groups provide hydrophilic polymer side chains in the polymeric dispersing agent, and may increase the polymeric dispersing agent water solubility, or may assist in wetting and stabilizing the dispersed pigment particles as discussed above. Exemplary acidic hydrophilic groups include carboxyl (e.g., —COOH), sulfonyl (e.g., —S(═O)OH) and organophosphorus (e.g., —P(═O)OH$_2$) groups as well as salts and esters thereof. Exemplary ethylenically unsaturated acidic monomers include acrylic acid, methacrylic acid, itaconic acid, 2-sulfoethyl (meth)acrylate, sulfopropyl (meth)acrylate, styrene sulfonic acid, vinyl sulfonic acid and the salts and esters thereof. Exemplary esters of unsaturated acidic monomers may be formed by reacting unsaturated acids with straight chain, cyclic or aromatic alcohols or polyols or their derivatives having 1 or more (e.g., 1 to 18) carbon atoms, or by reacting unsaturated alcohols with straight chain, cyclic or aromatic carboxylic acids or polyacids or their derivatives having 1 or more (e.g., 1 to 18) carbon atoms. Exemplary salts of unsaturated acidic monomers include alkali metal and ammonium salts. Exemplary amido groups include acrylamido (e.g., —C(═O)NH$_2$) groups. Exemplary ethylenically unsaturated amido monomers include 2-(meth)acrylamido-2-methyl propanesulfonic acid, methacrylamide, methoxy methacrylamide, methoxy methyl methacrylamide and n-butoxy methyl methacrylamide. Mixtures of ethylenically unsaturated hydrophilic monomers may also be employed. The ethylenically unsaturated hydrophilic monomer may for example represent about 0 to about 90 wt. % of the disclosed polymeric dispersing agent.

The polymeric dispersing agent may if desired be formed using appropriate amounts of other ethylenically unsaturated monomers, for example acrylonitriles, vinyl ethers and other monomers that will be familiar to persons having ordinary skill in the art. The disclosed polymeric dispersing agents may also be formed using monomers that do not provide polymeric side chains like discussed above, provided that monomers containing precursor units which can be modified by postpolymerization reactions to provide polymer side chains like those discussed above. For example, the above-mentioned U.S. Patent Application Publication No. US2011/0137001 A1 describes postpolymerization betainization that may be employed to provide polymer side chain groups like those which would have been obtained had the above-described zwitterionic monomers been employed. Other postpolymerization reactions for providing other polymer side chain groups like those discussed above will be apparent to persons having ordinary skill in the art.

The polymeric dispersing agent may be formed in the presence of one or more optional chain-growth polymerization initiators (viz., catalysts). Exemplary initiators include hydroperoxide, persulfate, peroxy and azo derivatives, and other initiators that will be familiar to persons having ordinary skill in the art. Exemplary hydroperoxide initiators include, without limitation, cumene hydroperoxide, t-butyl hydroperoxide, hydrogen peroxide, and the like. Exemplary persulfate initiators include, without limitation, sodium persulfate, potassium persulfate, ammonium persulfate, and the like. Exemplary peroxy initiators include t-butyl peroxy-2-ethylhexanoate, di-t-butyl peroxide, di-cumyl peroxide, tertiary amyl peroxide, cumene hydroperoxide, di-n-propyl peroxydicarbonate, tertiary amyl peracetate, and the like. Exemplary azo initiators include 2,2-azobis(2-methylisobutyronitrile), 2,2-azobis(2-methylbutanenitrile), 2,2-azobis(2,4-dimethyl pentanenitrile), 2,2-azobis(2,4-dimethyl-4-ethoxyvaleronitrile) and the like.

The polymeric dispersing agent may be prepared by copolymerizing the ethylenically unsaturated zwitterionic and non-zwitterionic monomers using techniques that will be familiar to persons having ordinary skill in the art. The amounts of each monomer may be adjusted to provide desired performance and other characteristics, with polymeric dispersing agents derived at least in part from one or more styrenes, acrylates or methacrylates being preferred. The polymeric dispersing agent typically will be formed in (or may be combined with) one or more solvents or carriers. Exemplary solvents or carriers include esters such as ethyl acetate and butyl acetate; ketones such as methyl ethyl ketone, methyl isobutyl ketone, methyl n-amyl ketone, and acetone; alcohols such as methanol, ethanol, isopropanol, and butanol; glycols such as ethylene glycol and propylene glycol; ethers such as tetrahydrofuran, ethylene glycol monobutyl ether, and propylene glycol methyl ether; and mixed ether acetates such as propylene glycol methyl ether acetate, diethylene glycol monobutyl ether acetate, and the like. In an aspect, where the polymeric dispersing agent includes an aqueous polymer dispersion, or a water-soluble polymer disperion, the carrier or solvent may be water. In some pigment grind dispersion embodiments (e.g., in some solvent-borne embodiments) the polymeric dispersing agent is a solution polymer with for example an acid number greater than about 2, greater than about 5, greater than about 10 or greater than about 20. In other pigment grind dispersion embodiments (e.g., in some waterborne embodiments) the polymeric dispersing agent is water-dispersible (as provided or via the addition of an appropriate neutralization agent) and may for example have an acid number of 0 or an acid number greater than about 20, greater than about 30, greater than about 50 or greater than about 100. The acid number may for example also be up to about 700, less than about 500 or less than about 300. Polymeric dispersing agents may also be prepared as solution polymers and then used in water-borne coating compositions by exchanging the polymerizing solvent for water after completion of solution polymerization so as to facilitate subsequent mixing of the polymeric dispersing agent and pigment particles in an aqueous carrier, or by separating the polymer from the polymerization solvent using techniques that will be familiar to those skilled in the art such as precipitating the polymer in a non-solvent and then re-dissolving the precipitate in an aqueous carrier.

The polymeric dispersing agent may have a variety of molecular weights. Preferably the molecular weight is sufficiently small so that the polymer will have low viscosity and good pigment wetting characteristics. The polymeric dispersing agent may for example have a weight average molecular weight (as measured using gel permeation chromatography and a polystyrene standard) that is greater than about 500, greater than about 2,000, greater than about 5,000 or greater than about 7,000. The weight average molecular weight may for example also be less than about 200,000, less than about 50,000, less than about 20,000, less than about 10,000 or less than about 8,000. Expressed on a weight basis, the pigment grind dispersion may for example contain about 5 to about 80 weight percent pigment, about 0.01 to about 10 weight percent polymeric dispersing agent, and about 10 to about 70 weight percent carrier. These amounts may however depend upon a variety of factors including the pigment type, density, surface area and oil absorption value.

The pigment particles and polymeric dispersing agent may be combined using techniques that will be familiar to persons having ordinary skill in the art. Preferably, they are combined in a carrier that will become an eventual carrier for the completed coating composition, in a mixture typically referred to as a "grind". The grind may if desired include grinding media and other components or ingredients that facilitate pigment size reduction and dispersion. The grind optionally may include one or more monomers that will be eventually be used to encapsulate the dispersed pigment particles, or such monomers may be added at after the pigment particles have been dispersed in the grind.

Once a suitable pigment particle size and degree of dispersion has been achieved, the pigment particles are next at least partially encapsulated by the disclosed polymer layer or layers. In an aspect, the polymer layer or layers may be a chain-growth polymer layer. In another aspect, the polymer layer or layers may be a step-growth polymer layer.

In an embodiment, where the polymer layer is a chain-growth polymer, the partial encapsulation may conveniently be performed by including in or adding to the pigment grind dispersion one or more ethylenically unsaturated monomers (such as the monomers discussed above) and an free-radical initiator (such as the initiators discussed above) and if need be additional carrier or a further carrier (such as the carriers discussed above) to form a pigment-encapsulating dispersion. Exemplary ethylenically unsaturated monomers for use in forming the chain-growth polymer layer or layers include styrene, acrylates and methacrylates such as, without limitation, styrene, substituted styrenes (e.g., vinyltoluene, alpha-methyl styrene, para-methylstyrene, para-t-butylstyrene, divinylbenzene, and the like), methyl methacrylate (MMA), ethyl methacrylate, 2-hydroxyethyl methacrylate (2-HEMA), methacryloxyethyl phosphate, sulfoethyl methacrylate, n-propyl methacrylate, isopropyl methacrylate, 2-hydroxypropyl methacrylate, n-butyl methacrylate, isobutyl methacrylate, t-butyl methacrylate, 4-hydroxylbutyl methacrylate, 2-ethyl hexyl methacrylate, isodecyl methacrylate, lauryl methacrylate, stearyl methacrylate, behenyl methacrylate, ethylene glycol dimethacrylate (EGDMA), trieththylene glycol dimethacrylate (TEGDMA), polypropylene glycol dimethacrylate (PPGDMA), dipropylene glycol dimethacrylate, 1,3- and 1,4-butanediol dimethacrylate, polyethylene glycol dimethacrylate (PEGDMA), 1,3-butylene glycol dimethacrylate, 1,6 hexane diol dimethacrylate (HDDMA), trimethylolpropane trimethacrylate (TMPTMA), tetramethylolpropane trimethacrylate, acetoacetoxyethyl methacrylate (AAEM), glycidyl methacrylate, trimethylcyclohexyl methacrylate, cyclohexyl methacrylate, t-butyl cyclohexyl methacrylate, isobornyl methacrylate, t-butyl cyclohexyl methacrylate, phenyl methacrylate, benzyl methacrylate, the acrylate counterparts thereof and mixtures thereof. Additional exemplary ethylenically unsaturated monomers include acrylamides and acrylonitriles such as methacrylamide, methoxy methacrylamide, methoxy methyl methacrylamide, n-butoxy methyl methacrylamide, methacrylonitrile, and the like. In some embodiments, the chain-growth polymer layer desirably is at least partially derived from one or more fatty acid (meth)acrylates, e.g., up to about 25 weight percent based on the starting ethylenically unsaturated monomers. Preferably, the chain-growth polymer layer is a latex polymer (for example, a single stage or multistage latex polymer).

In an embodiment, where the polymer layer is a step-growth polymer, the partial encapsulation may conveniently be performed by including in or adding to the pigment grind dispersion one or more highly-functional reactive monomers or oligomers that can form a polymer by step-growth to provide a pigment-encapsulating dispersion. Exemplary polymers formed by step-growth as described herein include the reaction products of one or more dibasic acids such as carboxylic acids including, without limitation, succinic acid, adipic acid, sebacic acid, a dimer acid, maleic anhydride, phthalic anhydride, isophthalic acid, and terephthalic acid, and the like with one or more polyhydric alcohols (e.g., diols, triols, tetraols, etc.) such as, without limitation, ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentanediol, 2-methyl-2,3-butanediol, 1,6-hexanediol, 1,2-hexanediol, 2,5-hexanediol, 2-methyl-2,4-pentanediol, 2,3-dimethyl-2,3-butanediol, 2-ethyl-hexanediol, 1,2-octanediol, 1,2-decanediol, 2,2,4-trimethylpentanediol, 2-butyl-2-ethyl-1,3-propanediol, 2,2-diethyl-1,3-propanediol, glycerin, trimethylolpropane, pentaerythritol, and the like. These polymers formed by step-growth may be further modified by reaction with one or more aromatic diisocyanates, aliphatic or alicyclic diisocyanates, polyisocyanates obtained therefrom, and the like.

In a preferred embodiment, at least one polymer layer formed as described herein is a film-forming binder and the at least partially encapsulated pigment particles are self-coalescing at room temperature without requiring the presence of another film-forming binder and without requiring coalescing aids containing objectionable quantities of VOCs.

The layers may be formed using a variety of methods including those described in U.S. Pat. No. 5,171,772 (Hoy et al.). The polymer layer or layers may for example have a calculated thickness of about 10 to about 400 nm, with the desired spacing being somewhat dependent on the pigment particle size. For example, for titanium dioxide particles having a 250 nm average particle size, the encapsulating polymer layer desirably has a thickness of about 100 nm so as to maintain a spacing of at least about one-half the minimum wavelength of visible light (viz., at least about 200 nm) between titanium dioxide particles.

The resulting pigment-encapsulating dispersion may optionally be combined with one or more binders or one or more coating adjuvants (such as thickeners, rheology modifiers, surfactants or coalescents) to form a finished coating. Exemplary binders will be familiar to persons having ordinary skill in the art, and may be in a variety of forms including latex polymers and solution polymers, e.g., acrylic copolymers, styrene/acrylic copolymers, vinyl acetate copolymers, vinyl acetate/acrylic copolymers, vinyl versatic acid ester/acrylic copolymers, ethylene/vinyl acetate copolymers, styrene/butadiene copolymers, alkyds, polyesters, polyester urethanes, drying oil modified polymers such as drying oil modified polyesters and polyurethanes, polyethers, polyamides, epoxy esters, polyureas, polyurethanes, polysiloxanes, silicones, fluorinated copolymers such as vinylidene fluoride, and blends of any of the above polymeric binders. The binder may include a component or components of a multicomponent (e.g., two-component) reactive system such as a component of an isocyanate-polyamine, isocyanate-polyol, epoxy-polyamine, carbodiimide-polyacid, aziridine-polyacid, melamine-polyol, or urea formaldehyde-polyol coating system. The binder may for example represent about 5 to about 99 volume percent of the dried coating volume. The volume solids, as defined by the fractional volume of dry ingredients in an as-supplied coating composition, may for example represent about 5 to about 80 volume percent of the coating composition. The pigment volume concentration, as defined by the fractional volume of pigment in a dried coating, may for example represent about 0.1 to about 95 volume percent of the coating. In some embodiments, the pigment volume concentration desirably is about 0.1 to about 30 volume percent, about 0.5 to about 25 volume percent, or about 1 to about 25 volume percent. The glass transition temperature for the polymeric binder may for example be about −130 to about 350° C., preferably about -20 to about 150° C., and more preferably about −10 to about 100° C. The coating composition viscosity may for example be about 10 to 100,000 cps at 25° C. as measured using a BROOKFIELD™ viscometer and RTV Spindle No. 4 operated at 20 rpm.

The recited thickeners, rheology modifiers, surfactants and coalescents will be familiar to persons having ordinary skill in the art. Exemplary thickeners or rheology modifiers include sedimentation inhibitors, hydrophobic ethoxylated urethane resin (HEUR) thickeners, hydrophobically-modified, alkali-soluble or alkali-swellable emulsion (HASE) thickeners), cellulosic thickeners, polysaccharide thickeners and mixtures thereof. Exemplary commercially-available rheology modifiers include NATROSOL™ 250 and the AQUAFLOW™ series from Ashland, ATTAGEL™ 50 from BASF Corp., the CELLOSIZE™ series and UCAR POLYPHOBE™ T-900 and T-901 from Dow Chemical Co., BENTONE™ AD and BENTONE EW from Elementis Specialties, LATTICE™ NTC-61 from FMC Biopolymer and ACRYSOL™ RM-6, ACRYSOL RM-8, ACRYSOL RM-12W and ACRYSOL RM-2020NPR all from Rohm & Haas. When a thickener or rheology modifier is present, the disclosed coating compositions preferably contain about 0.1 to about 10 or about 0.5 to about 3 weight percent thickener or rheology modifier based on the final coating composition weight.

Exemplary surfactants include anionic, cationic, amphoteric and nonionic surfactants. Commercially-available surfactants or dispersants include the TAMOL™ series from Dow Chemical Co., nonyl and octyl phenol ethoxylates from Dow Chemical Co. (e.g., TRITON™ X-45, TRITON X-100, TRITON X-114, TRITON X-165, TRITON X-305 and TRITON X-405) and other suppliers (e.g., the T-DET N series from Harcros Chemicals), alkyl phenol ethoxylate (APE) replacements from Dow Chemical Co., Elementis Specialties, and others, various members of the SURFYNOL™ series from Air Products and Chemicals, (e.g., SURFYNOL 104, SURFYNOL 104A, SURFYNOL 104BC, SURFYNOL 104DPM, SURFYNOL 104E, SURFYNOL 104H, SURFYNOL 104PA, SURFYNOL 104PG50, SURFYNOL 104S, SURFYNOL 2502, SURFYNOL 420, SURFYNOL 440, SURFYNOL 465, SURFYNOL 485. SURFYNOL 485W, SURFYNOL 82, SURFYNOL CT-211, SURFYNOL CT-221, SURFYNOL OP-340, SURFYNOL PSA204, SURFYNOL PSA216, SURFYNOL PSA336, SURFYNOL SE and SURFYNOL SE-F), various fluorocarbon surfactants from 3M, E.I. DuPont de Nemours and Co. and other suppliers, and phosphate esters from Ashland, Rhodia and other suppliers. When a surfactant is present, the disclosed coating compositions preferably contain about 0.1 to about 10 weight percent and more preferably about 1 to about 3 weight percent surfactant based on the total composition weight.

Coalescents may assist in coalescing the encapsulated pigment particles or optional further film-forming polymer into a continuous film. Exemplary coalescents include benzoates such as alkyl benzoates, monobenzoates and dibenzoates; hexanoates such as OPTIFILM™ 400 tri(ethylene glycol) bis(2-ethylhexanoate) from Eastman Chemical Co.; dioctyl maleate; oleic acid propylene glycol esters such as EDENOL™ EFC-100 from Cognis having the formula $HOCH(CH_3)CH_2OC(O)(CH_2(CH=CH(CH_2)_7CH_3)$;

UCAR Filmer ffiT, UCAR n-propyl propionate, UCAR n-butyl propionate and UCAR n-pentyl propionate from DOW Chemical Co.; and TEXANOL™ ester alcohol from Eastman Chemical Co.; materials discussed in U.S. Pat. Nos. 6,762,230 B2, 7,812,079 B2 and 8,110,624 B2 (collectively, Brandenburger et al.) and in U.S. Pat. Nos. 8,106,239 B2 (Zhou et al.) and 8,394,496 B2 (Foster et al.), in U.S. Published Patent Application No. US 2009/0149591 A1 (Yang et al.); mixtures thereof and the like. Other coalescents that may be added to water-borne embodiments include VOCs including glycol ethers, organic esters, aromatic compounds, and ethylene or propylene glycols. When a coalescent is present, the disclosed coating compositions preferably contain about 0.05 to about 10 or about 0.05 to about 5 weight percent coalescent based on the final coating composition weight.

The disclosed coating compositions may contain a variety of other adjuvants that will be familiar to persons having ordinary skill in the art. Representative adjuvants are described in Koleske et al., Paint and Coatings Industry, April, 2003, pages 12-86. Exemplary adjuvants and commercial examples of the same include adhesion promoters; anti-cratering agents; antioxidants; biocides, fungicides, mildewcides and preservatives (e.g., BUSAN™ 1292 from Buckman Laboratories, Inc., NOPCOCIDE™ N-40D from Cognis, KATHON™ LX from Rohm & Haas, and POLYPHASE™ 663, POLYPHASE 678 and POLYPHASE PW-40 from Troy Corporation); buffers; curing indicators; defoamers; heat stabilizers; humectants; leveling agents; light stabilizers (e.g., hindered amine light stabilizers such as TINUVIN™ 123-DW and TINUVIN 292 HP from Ciba Specialty Chemicals); neutralizers; optical brighteners; pearlescents; plasticizers; polymeric additives; reactive diluents; tackifiers; ultraviolet light absorbers (e.g., TINUVIN 234 and TINUVIN 1130 from Ciba Specialty Chemicals); waxes (e.g., AQUACER™ 593 from Altana, HYDROCER™ 303 from Shamrock Technologies, Inc. and MICHEM™ Emulsion 32535 from Michelman, Inc.); wetting agents (e.g., BYK™ 346 and BYK 348 from Altana, PENTEX™ 99 from Rhodia and TROYSOL LAC™ from Troy corporation); and the like. The types and amounts of these and other adjuvants typically will be empirically selected.

The pigment-encapsulating dispersions preferably are universal dispersions whose vehicles and other ingredients render them suitable for use in solvent-borne and water-borne coating compositions. The pigment-encapsulating dispersions may be used to form or may be added to a variety of coating compositions including primers, primer surfacers, topcoats (including monocoats), and basecoats for clearcoat/basecoat finishes. These coating compositions may contain crosslinking agents including blocked isocyanates, alkylated melamines, polyisocyanates, epoxy resins, and the like, and may be solvent-borne or water- borne. A variety of vehicles or carriers may be employed in solvent-borne or water-borne embodiments. Exemplary solvents and carriers include those mentioned above. The disclosed coating compositions preferably are low VOC dispersions containing 0.01 to less than 5 weight percent VOCs, more preferably 0.01 to less than 2.5 weight percent VOCs, and most preferably 0.01 to less than 0.5 weight percent VOCs based upon the total liquid composition weight.

The disclosed coatings may be applied to a variety of substrates. Exemplary substrates include cement, cement fiberboard, concrete, metal, plastic and wood (including monolithic, engineered and veneered wood). The dried or hardened paints and stains may be evaluated using a variety of measurements including adhesion (as measured for example using ASTM D3359-07), block resistance (as measured for example using ASTM D4946-89, Reapproved 2003), chalking (as measured for example using ASTM D4214-07), cracking (as measured for example using ASTM D661-93), contrast ratio (CR, measured as described above), dirt retention (as measured for example using ASTM D3719-00), fading or color change (as measured for example using ASTM D2244-11), gloss or loss of gloss (as measured for example using ASTM D523-08), impact resistance (as measured for example using ASTM D2794-93, Reapproved 2010), low temperature coalescence (LTC, as measured for example using ASTM D3793-06), pendulum hardness (as measured for example using ASTM D-4366-95), scrub test (as measured for example using ASTM D2486-06), practical washability (as measured for example using ASTM D4828-94), tint strength (TS, as measured for example using ASTM D-2066-07), water resistance (as measured for example using ASTM D870-09) or collected measurement standards (for example those set forth in ASTM D3730-10 and ASTM D5324-10).

The invention is further described in the following Examples, in which all parts and percentages are by weight unless otherwise indicated.

Abbreviations

BA n-butyl acrylate
MMA methyl methacrylate
MAA methacrylic acid
AA acrylic acid
AAm acrylamide
DMAEMA dimethylaminoethyl methacrylate
BzCl benzyl chloride
SBMA sulfobetaine methacrylate
DMAEMA-BzCl dimethylaminoethyl methacrylate benzyl chloride quaternary amine
APS ammonium persulfate
MEK methyl ethyl ketone
NVM non-volatiles by mass (percent solids)
2ME 2-mercaptoethanol
tBHP t-butyl hydroperoxide (70% aq.)
FF6 BRUGGOLITE™ FF6 (from Bruggemann Chemical)

PREPARATORY EXAMPLE 1

Zwitterionic Copolymer Dispersing Agent Aqueous Dispersion Preparation

A 173.92 g portion of deionized water and 1.94 g of Rhodacal DS-4 were added to a four-neck 2 L flask equipped with a condenser, mechanical stirring blade, nitrogen purge adaptor and a thermocouple and heated to 82° C. While at this temperature and stirring under nitrogen, 28.93 g of a monomer pre-emulsion comprising 49.61 g deionized water, 8.01 g of Rhodacal DS-4, 72.78 g of BA, 121.29 g of SBMA, 36.39 g of MAA, and 1.21 g of 2ME were added to the reaction flask. After two minutes, a premix of 10.0 g of deionized water and 2.43 g of APS were added to the flask. The contents of the flask were stirred for 20 minutes at 81-82° C. after which the remaining monomer pre-emulsion was fed into the reaction vessel at an even rate over the course of 62 minutes. The temperature of the reaction flask was maintained at 80-84° C. during the feed. After the monomer pre-emulsion feed was complete, 10.0 g of deionized water was used to rinse the monomer pre-emulsion beaker and feed tube. The contents of the reaction flask were then held at temperature for 18 minutes while agitating. Next, 0.33 g tBHP was added to the reaction flask, followed immediately by the addition of a premix of 10.0 g of deionized water and 0.25 g of FF6. Seventeen minutes after the last addition, the batch was allowed to cool. The NVM of the resulting product was determined to be 48.1%.

PREPARATORY EXAMPLE 2

Zwitterionic Monomer Sulfobetaine Methacrylate (SBMA)

In a 200 mL Erlenmeyer flask, 30.01 g DMAEMA and 30.03 g MEK were combined at room temperature. The resulting solution was cooled in an ice bath for 10 minutes, followed by the addition of 23.27 g 1,3-propanesultone in one portion. The reaction was cooled in an ice bath for another 20 minutes and then allowed to warm gradually to room temperature. The reaction flask was left uncapped. After two hours, the product had precipitated and was collected over filter paper. The product, SBMA, was transferred to an aluminum foil boat and dried.

PREPARATORY EXAMPLE 3

Hydrophobic Water-Soluble Monomer DMAEMA-BzCl

In a 200 mL Erlenmeyer flask, 40.03 g DMAEMA, 32.27 g BzCl and 40.07 g MEK were combined in one portion. The resulting mixture was stirred and warmed to about 40-50° C. for 2 hours and then left at room temperature overnight. The precipitated product, DMAEMA-BzCl, was collected on a filter and dried.

PREPARATORY EXAMPLE 4

Zwitterionic Copolymer Dispersing Agent Preparation in Water

A 100.45 gportion of deionized water was added to a four neck 1 L kettle equipped with a condenser, mechanical stirring blade, nitrogen purge adaptor and 2 hole rubber septum. The kettle was purged with nitrogen for 30 minutes at 91° C. While at this temperature and under mechanical stirring, a monomer solution made from 6.01 g DMAEMA-BzCl, 10.00 g SBMA, 3.03 g MAA, 0.10 g 2ME, 0.20 gAPS and 50.04 g deionized water was added over 31 minutes. A chaser solution made from 0.15 g APS and 9.89 g deionized water was added over 11 minutes. The reaction mixture was held at 90° C. for another 100 minutes to remove excess initiator. The NVM was determined to be 11.30%.

EXAMPLE 1

Titanium Dioxide Dispersion Preparation

A titanium dioxide dispersion was prepared by the gradual addition of 500.0 g TI-PURE™ R706 titanium dioxide over five minutes to a stirred aqueous solution containing 21.8 g of the Preparatory Example 1 zwitterionic copolymeric dispersing agent aqueous dispersion diluted with 125.3 g deionized water. This mixture was stirred at high speed for an additional 30 minutes, then diluted to 73% NVM with 51.5 g of deionized water to yield a titanium dioxide slurry containing 71.57 wt. % titanium dioxide and 1.43 wt. % copolymeric dispersing agent.

EXAMPLE 2

Titanium Dioxide Dispersion Preparation

A titanium dioxide grind dispersion was prepared by the gradual addition of 750.30 g TI-PURE™ R706 titanium dioxide over 5 minutes to a stirred aqueous solution containing 109.49 g of the Preparatory Example 4 polymeric dispersing agent solution diluted with 191.55 g deionized water. This mixture was stirred at high speed for an additional 60 minutes to yield a titanium dioxide slurry containing 71.4 wt. % titanium dioxide and 1.14 wt. % polymeric dispersing agent.

EXAMPLE 3

Encapsulated Titanium Dioxide Latex Formation 470.53 g of the titanium dioxide slurry made in Example 1 was transferred to a 2-liter kettle and diluted with 189.77 g deionized water and 25.65 g RHODA CAL™ DS-4 surfactant. The kettle was heated to 50° C., followed by the addition of 0.18 grams of tBHP and 0.15 g of a 7% solution of sodium feredetate. Next, a first monomer emulsion containing 11.74 g deionized water, 37.69 g of BMA, 25.96 g of MMA, 1.36 grams of MAA, 0.90 grams of tBHP and 12.83 g Rhodacal DS-4 surfactant was fed over 20 minutes and a concurrent reducer mixture fed over 120 minutes. The reducer mixture contained 2.49 g of FF6 reducing agent in 81.25 g of deionized water. The first monomer emulsion was rinsed with 10.0 g of deionized water and immediately followed by the addition of a second monomer emulsion containing 150.77 g BA, 106.53 g MMA, 2.71 g MAA, 49.07 g of Rhodacal DS-4, 51.46 g of deionized water, and 3.61 g of tBHP. The second monomer feed was fed over 84 minutes and rinsed with 15.0 g of deionized water. The pH of the product was adjusted to about 8.2 via aqueous ammonium hydroxide addition. The reaction product was an encapsulated titanium dioxide latex with virtually no coagulum or reactor fouling containing 55.7% NVM.

EXAMPLE 4

Encapsulated Titanium Dioxide Latex Formation 939.55 g of the titanium dioxide slurry made in Example 2 was transferred to a 3- liter kettle and diluted with 382 g deionized water and 51.29 g RHODACAL™ DS-4 surfactant from Solvay. The kettle was heated to 50° C., followed by the addition of 200 g of a first monomer emulsion containing 45.65 g deionized water, a monomer mixture containing 58%/40%/2% BA/MMA/MAA and 25.65 g RHODACAL DS-4 surfactant fed over 20 minutes and a concurrent redox initiator mixture fed over 126 minutes. The first monomer emulsion and redox initiator feeds were followed by the addition of 750 g of a second monomer emulsion containing 58%/41%/11% BA/MMA/MAA fed over 70 minutes. The first and second monomer emulsions were in a 20:80 volumetric ratio, and the redox initiator feed contained 1.0 wt. % tBHP and 0.76 wt. % FF6 based on the total monomer weight. The pH of the product was adjusted to about 9 via aqueous ammonium hydroxide addition. The reaction product was an encapsulated titanium dioxide latex having a 470 nm average particle size with a monomodal particle size distribution and containing 55.5% NVM.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

We claim:

1. A polymer-encapsulated pigment dispersion comprising a mixture of three components:
   a) as a first component, a liquid carrier;
   b) as a second component, pigment particles, the particles being at least partially encapsulated by at least one polymer layer having a calculated thickness of about 10 to about 400 nm; and
   c) as a third component, a polymeric dispersing agent that helps wet out the pigment particles, the polymeric dispersing agent having:
      i) a polymer backbone; and
      ii) a zwitterionic polymer side chain comprising one or more sulfate, sulfonate or carboxylate anionic groups, and one or more cationic groups.

2. The dispersion of claim 1, wherein the pigment particles have a refractive index of at least about 1.8.

3. The dispersion of claim 1, wherein the liquid carrier is selected from ethyl acetate, butyl acetate, methyl ethyl ketone, methyl isobutyl ketone, methyl n-amyl ketone, acetone, methanol, ethanol, isopropanol, butanol, ethylene glycol, propylene glycol, tetrahydrofuran, ethylene glycol monobutyl ether, propylene glycol methyl ether, propylene glycol methyl ether acetate, diethylene glycol monobutyl ether acetate, and combinations thereof.

4. The dispersion of claim 1, wherein the liquid carrier is water.

5. The dispersion of claim 1, wherein the dispersion includes about 10 to 70 percent carrier by weight.

6. The dispersion of claim 1, wherein the pigment particles comprise titanium dioxide particles.

7. The dispersion of claim 1, wherein the polymer layer is a step-growth polymer.

8. The dispersion of claim 1, wherein the polymer layer is a chain-growth polymer.

9. The dispersion of claim 8, wherein the chain-growth polymer is a latex polymer.

10. The dispersion of claim 8, wherein the at least partially encapsulated pigment particles are self-coalescing at room temperature without requiring the presence of a film forming binder containing a polymer other than the chain-growth polymer.

11. The dispersion of claim 1, wherein the polymeric dispersing agent has a vinyl chain-growth polymer backbone.

12. The dispersion of claim 1, wherein the anionic groups comprise sulfonate groups.

13. The dispersion of claim 1, wherein the cationic groups comprise quaternary ammonium groups.

14. The dispersion of claim 1, wherein the anionic groups comprise sulfate groups.

15. The dispersion of claim 1, wherein the anionic groups comprise carboxylate groups.

16. The dispersion of claim 1, wherein the zwitterionic polymer side chain is derived from a sulfobetaine (meth) acrylate.

17. The dispersion of claim 1, wherein the zwitterionic polymer side chain is derived from a carboxybetaine (meth) acrylate.

18. A coating composition comprising the dispersion of claim 1, and further comprising one or both of:
   a) a film-forming binder containing a polymer other than the polymer backbone of the polymeric dispersing agent; or
   b) one or more thickeners, rheology modifiers, surfactants or coalescents.

19. The composition of claim 18, wherein the pigment particles have a refractive index of at least about 1.8.

* * * * *

UNITED STATES PATENT AND TRADEMARK OFFICE
CERTIFICATE OF CORRECTION

PATENT NO. : 10,233,329 B2
APPLICATION NO. : 14/997891
DATED : March 19, 2019
INVENTOR(S) : Ness et al.

It is certified that error appears in the above-identified patent and that said Letters Patent is hereby corrected as shown below:

In the Claims

Column 18, Line 43, after the word "the" insert --pigment--
Column 18, Line 54, after the first occurrence of the word "The" insert --polymer-encapsulated pigment--
Column 18, Line 56, after the first occurrence of the word "The" insert --polymer-encapsulated pigment--
Column 18, Line 57, after "from" insert --the group consisting of--
Column 18, Line 64, after the first occurrence of the word "The" insert --polymer-encapsulated pigment--
Column 18, Line 66, after the first occurrence of the word "The" insert --polymer-encapsulated pigment--
Column 18, Line 67, the phrase "carrier by weight" should read --by weight of the liquid carrier--
Column 19, Line 1, after the first occurrence of the word "The" insert --polymer-encapsulated pigment--
Column 19, Line 3, after the first occurrence of the word "The" insert --polymer-encapsulated pigment--
Column 19, Line 5, after the first occurrence of the word "The" insert --polymer-encapsulated pigment--
Column 19, Line 7, after the first occurrence of the word "The" insert --polymer-encapsulated pigment--,
   And the phrase "chain-growth" should read --dispersion--
Column 19, Line 8, the phrase "polymer is a latex polymer" should read --is a latex--
Column 19, Line 9, after the first occurrence of the word "The" insert --polymer-encapsulated pigment--
Column 19, Line 14, after the first occurrence of the word "The" insert --polymer-encapsulated pigment--
Column 19, Line 17, after the first occurrence of the word "The" insert --polymer-encapsulated pigment--

Signed and Sealed this
Thirteenth Day of August, 2019

Andrei Iancu
*Director of the United States Patent and Trademark Office*

Page 1 of 2

CERTIFICATE OF CORRECTION (continued)
U.S. Pat. No. 10,233,329 B2

Column 19, Line 19, after the first occurrence of the word "The" insert --polymer-encapsulated pigment--
Column 20, Line 1, after the first occurrence of the word "The" insert --polymer-encapsulated pigment--
Column 20, Line 3, after the first occurrence of the word "The" insert --polymer-encapsulated pigment--
Column 20, Line 5, after the first occurrence of the word "The" insert --polymer-encapsulated pigment--
Column 20, Line 8, after the first occurrence of the word "The" insert --polymer-encapsulated pigment--
Column 20, Line 11, after the word "the" insert --polymer-encapsulated pigment--
Column 20, Line 18, after the first occurrence of the word "The" insert --coating--